L. H. WILSON.
RESERVE TANK FOR LIQUID CONTAINERS.
APPLICATION FILED AUG. 27, 1913.
1,116,778.
Patented Nov. 10, 1914.
2 SHEETS—SHEET 1.
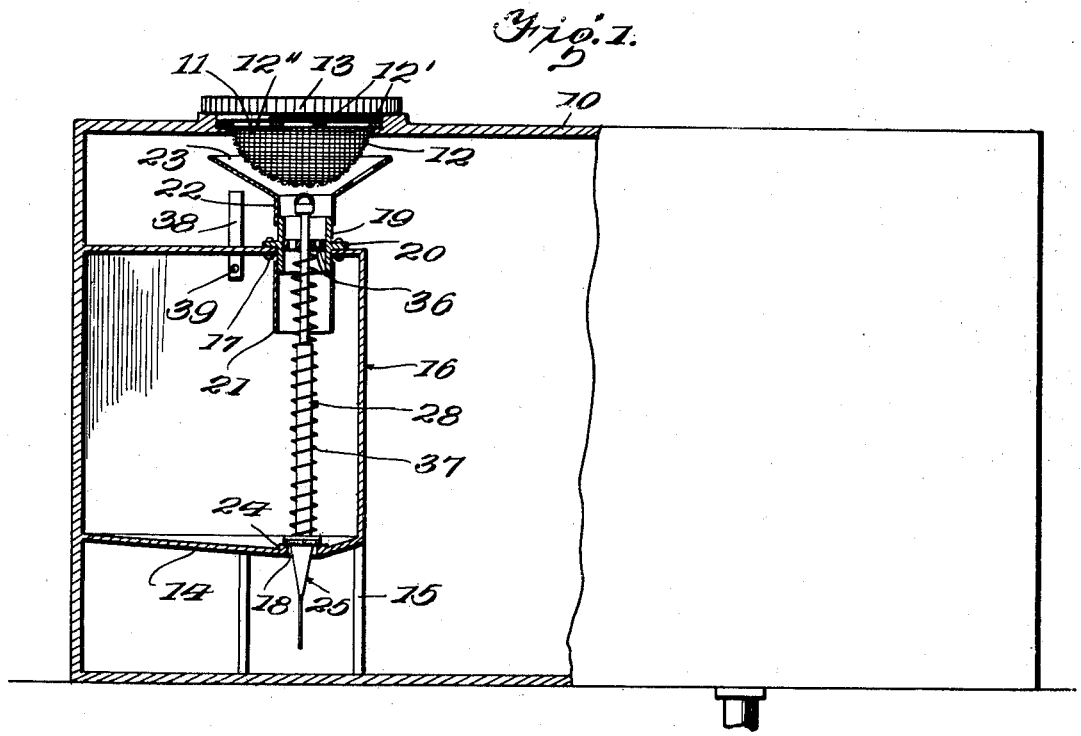
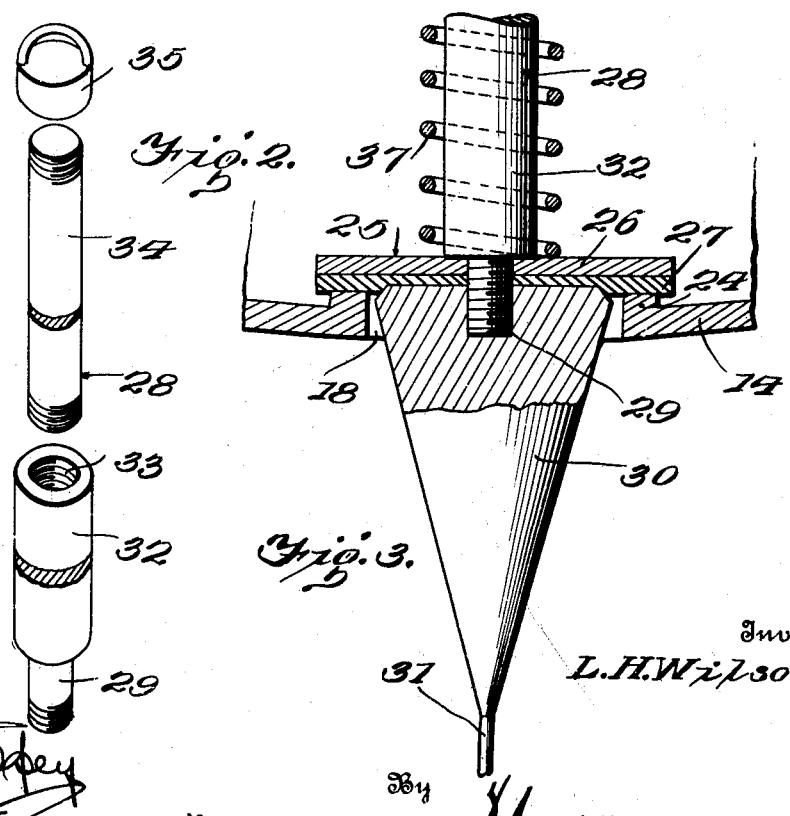
Inventor
L. H. Wilson L. H. WILSON.
RESERVE TANK FOR LIQUID CONTAINERS.
APPLICATION FILED AUG. 27, 1913.
1,116,778.
Patented Nov. 10, 1914.
2 SHEETS—SHEET 2.
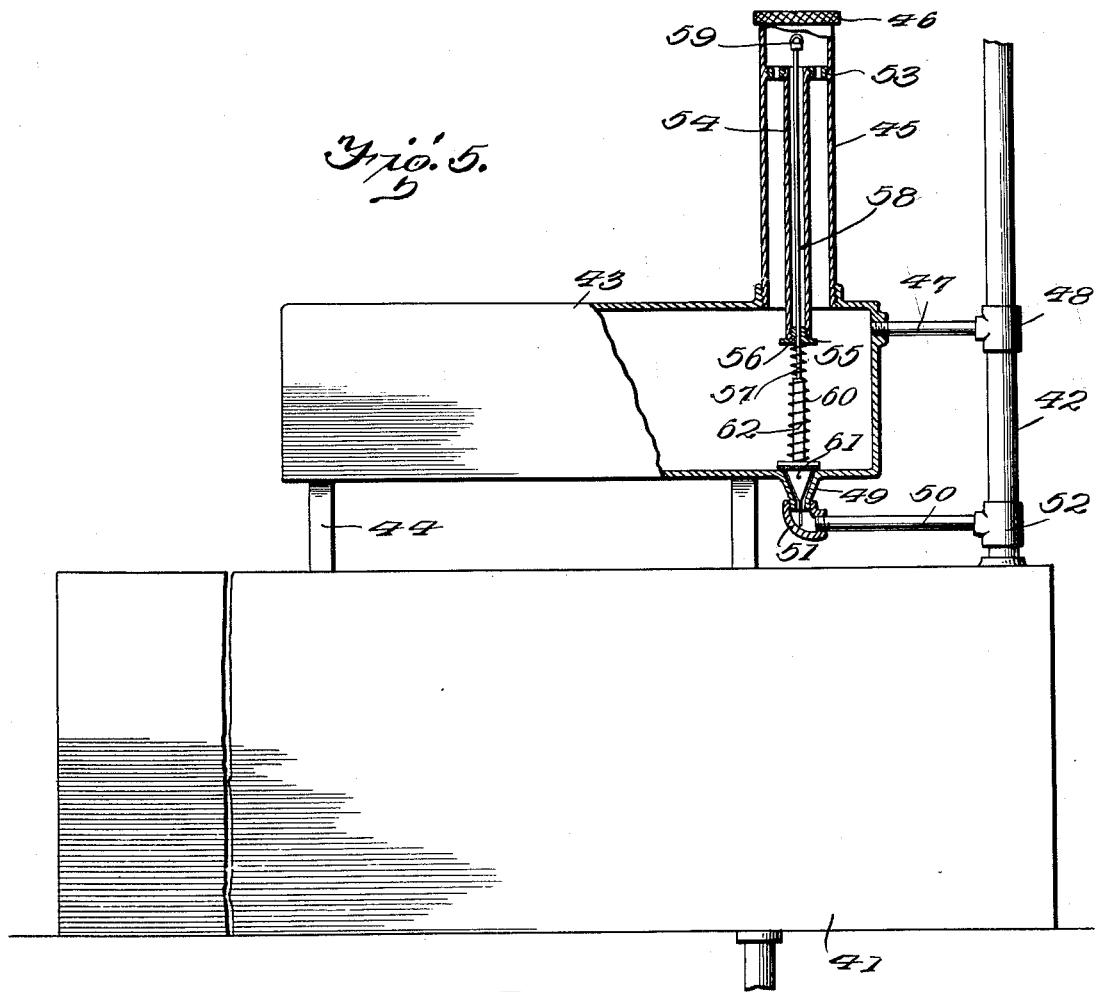
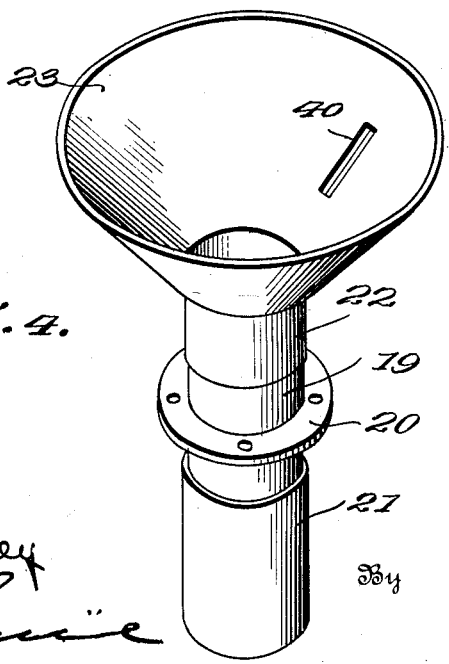
Inventor
L. H. Wilson.

UNITED STATES PATENT OFFICE.

LEWIS H. WILSON, OF IHLEN, MINNESOTA.

RESERVE-TANK FOR LIQUID-CONTAINERS.

1,116,778.  Specification of Letters Patent.  Patented Nov. 10, 1914.

Application filed August 27, 1913. Serial No. 786,877.

*To all whom it may concern:*

Be it known that I, LEWIS H. WILSON, citizen of the United States, residing at Ihlen, in the county of Pipestone and State of Minnesota, have invented certain new and useful Improvements in Reserve-Tanks for Liquid-Containers, of which the following is a specification.

My invention relates to new and useful improvements in tanks or other containers for liquids, the primary object of my invention being the provision of a reserve tank for use in conjunction with the main tank, both tanks being filled with liquid and so arranged that when all the liquid contained in the main tank has been withdrawn that contained in the reserve tank may be discharged into the main tank and subsequently withdrawn therefrom. Gasolene and oil tanks for automobile and other gas engines, water tanks for boilers and acetylene generators, and, in fact, nearly all liquid containers now in use will be benefited by such an arrangement, as it will act as a warning that the tank should be refilled before all of its contents have been withdrawn. This is of great importance in automobiles, particularly because of the fact that without some such safe-guard to give warning the entire supply of gasolene might be used up while the vehicle was at a considerable distance from any source of supply. With the reserve tank warning will be given as soon as all the gasolene contained in the main tank has been used and the vehicle may be driven upon the gasolene contained in the reserve tank to the nearest source of supply.

A further object of my present invention is to so arrange the main tank and reserve tank as to insure the filling of the reserve tank when the main tank is filled, this being accomplished by so arranging the two tanks that the reserve tank must be filled before any liquid passes to the main tank.

A still further object of my invention is to provide a valve normally shutting off the communication between the reserve and main tanks which must be manually operated to permit the flow of liquid from the reserve tank to the main tank and which will, therefore, serve as a warning that the liquid in the main tank has been exhausted.

A still further object of my invention is to provide means whereby the depth or amount of liquid in the main tank may be conveniently measured.

With these and other objects in view, my invention will be more fully described, illustrated in the accompanying drawing and then specifically pointed out in the claims which are attached hereto and form a part of this application.

In the drawing Figure 1 is an elevational view of a conventional form of gasolene tank, such as is commonly employed upon motor vehicles, parts being shown in section to disclose the method of installing my reserve tank therein; Fig. 2 is an unassembled perspective view of the valve stem employed in connection with my reserve tank, parts being broken away to permit the showing of the same upon a somewhat larger scale; Fig. 3 is a detail elevational view of the valve employed to control the admission from the reserve tank to the main tank, parts being shown in section to more clearly bring out certain details in construction; Fig. 4 is a perspective view of the filling spout of the reserve tank; Fig. 5 is an elevational view, partly in section, showing my invention applied to a tank of the underground type.

Corresponding and like parts are referred to in the following description and indicated in all the views of the accompanying drawings by the same reference characters.

Referring first to the form of my invention disclosed in Fig. 1, 10 indicates the main tank, this being of any desirable construction, as my reserve tank is applicable to all forms of liquid containers. This tank is provided with the usual filling opening 11 in which is seated a screen 12, the opening being normally closed by a screw cap 13. Built within the tank 10 with its bottom 14 supported in spaced relation above the bottom of the tank 10 by standards 15, or in any other suitable manner, is an auxiliary tank 16, this tank being so built within the main tank that its top is positioned somewhat below that portion of the top of the main tank in which the filling opening 11 is formed.

The auxiliary tank 16 is provided in its top and bottom with openings 17 and 18 in alinement with each other and with the opening 11 of the main tank, the former opening constituting the filling opening of the auxiliary tank, while the latter provides means for admitting the contents of the auxiliary tank to the main tank. An internally threaded nipple 19 seats within the opening 17 of the auxiliary tank and is secured by a laterally directed flange 20 to the top of said tank, the flange being riveted, soldered, or otherwise secured to the tank. A cylindrical sleeve 21 is soldered or otherwise secured about the inner end of the nipple 19 to prevent splashing of the contents of the reserve tank therethrough, while the neck 22 of a funnel 23 is similarly secured about the outer end of the nipple. This funnel is somewhat greater in diameter at its upper end than the diameter of the filling opening 11 of the main tank and terminates at its upper end in spaced relation to the top of said tank. It will, therefore, be clear that any liquid poured through the opening 11 of the main tank will be poured directly into the funnel 23 and will, therefore, pass into the reserve tank 16.

The bottom 14 of the reserve tank is provided with a valve seat 24 surrounding the opening 18 and a valve 25 normally closes the opening 18 and, therefore, prevents the passage of liquid therethrough into the main tank.

The valve 25, as best shown in Figs. 2 and 3 of the drawing, includes a disk 26, preferably formed of metal and acting as a support for a packing disk 27 of rubber or other suitable material. One end of a valve stem, indicated as a whole by the numeral 28, is reduced and threaded, as shown at 29, and passed through perforations formed centrally of the disks 26 and 27 and threaded into the larger end of a conical valve guide 30 having an axially extending guide rod 31, the valve guide 30 being movable into and out of the opening 18. The valve stem 28 includes a lower member 32 upon which is formed the reduced terminal 29, previously described, and in the upper end of which is formed a threaded socket 33, and a second member 34 externally threaded at each end, the lower end of said second member being threaded into the socket 33 of the first member. A bail cap 35 is threaded upon the upper end of the second member 34 of the valve stem to provide a handle by means of which the valve may be raised. This valve stem is of such length that when the valve is closed the free end of the valve stem will extend into the lower mouth of the funnel 23 in position to be readily grasped by any one reaching through the filling opening 11 of the main tank. In order to properly centralize the valve and valve stem a perforated disk or spider 36 is threaded into the nipple 19, this spider being provided centrally with an opening for the passage of the upper member 34 of the valve stem. The upper member 34 of the valve stem is somewhat less in diameter than the lower member, and it will, therefore, be apparent that when the valve stem has been raised a certain distance the upper end of the lower member 32 of the valve stem will engage against the lower face of the spider 36 and prevent further upward movement. The relative lengths of the parts of the valve stem are such that this checking of upward movement will take place before the lower end of the guide finger 31 has passed upwardly through the opening 18, for which reason any complete disengagement of the valve from its seat is prevented. In order to normally hold the valve in closed position, I provide a helical spring 37 through which the valve stem extends, one end of this spring bearing against the upper face of the disk 26, while the latter engages beneath the lower face of the spider 36.

In order to insure proper filling and emptying of the reserve tank 16, I provide a vent pipe 38 which extends through the top of the reserve tank 16 with its open upper end spaced somewhat below the funnel 23 and with its inner end closed. This vent pipe is provided adjacent its inner closed end with an opening 39 for the passage of air into and out of the reserve tank 16. By this arrangement, air may pass freely in and out of the reserve tank, while any splashing of liquid through the vent pipe is avoided. The funnel 23 is provided with a slot 40 so arranged that a yard stick or other suitable measuring instrument may be passed through the filling opening 11 of the main tank, through the slot 40 and to the bottom of the main tank to permit measuring of the depth of liquid contained therein. It will, of course, be clear that some of the liquid entering the funnel will pass through this slot, but such escape of liquid will not be sufficient to in any way affect the certain filling of the reserve tank 16.

In use, the cap 13 is removed and liquid poured into the filling opening 11 in the usual manner. This liquid instead, however, of passing directly into the main tank passes into the reserve tank 16 through the funnel 23, nipple 19 and sleeve 21. During this filling operation the valve 25 is closed and no liquid can, therefore, escape from the reserve tank to the main tank. As soon as the reserve tank has been completely filled, assuming that liquid is still poured into the opening 11, this liquid will overflow the funnel 23 and fill the main tank 10. When both the reserve tank and main tank have been filled, the screw cap 13 is replaced in the usual manner. The liquid may then be withdrawn from the main tank 10, as desired for use, until such tank has become entirely emptied. When this takes place, the cap 13 may be removed, the handle 35 of the valve stem grasped to raise the valve and the contents of the reserve tank drained into the main tank, after which the valve may be released and the cap replaced. This added supply of liquid to the main tank may then be drawn therefrom for use as required. The necessity of emptying the reserve tank into the main tank gives warning of the decreased supply of liquid and the tanks may, therefore, be filled before all the liquid contained in both has been used.

In many instances, it will be found inconvenient or impracticable to build the reserve tank within the main tank, this being particularly true of supply tanks for gasolene and other oils which are commonly buried in the ground. For this reason, I have illustrated one method of mounting my reserve tank outside of the main tank, this method being clearly shown in Fig. 5 of the drawing. In this figure, the main tank is indicated as a whole by the numeral 41, being provided with the usual pipe 42 extending at its upper end above the surface of the ground to permit filling of the tank. In such a case, I mount my reserve tank 43 either directly upon the top of the main tank 41 or upon brackets 44 carried by said tank and provide said reserve tank with a filling pipe 45, the upper end of which extends above the ground and is closed by a screw cap 46. A pipe 47 leads from the upper portion of the reserve tank 43 to the pipe 42, being connected thereto by a T-coupling 48. The bottom of the reserve tank 43, immediately below the pipe 45, is provided with a downwardly extending nipple 49 through which the contents of the tank 43 may discharge, and a pipe 50 connects an elbow 51 threaded upon the free end of this nipple with a T-coupling 52 in the pipe 42. A spider 53 is threaded into the upper portion of the pipe 45 and a sleeve 54 has its upper end threaded into the spider 53 and its lower end, which extends within the reserve tank 43, closed by a threaded plug 55 having an opening 56 for the passage of the reduced upper portion 57 of a valve stem 58. This valve stem is provided at its upper end, which extends above the sleeve 54, with a handle 59 similar to the handle 35, and the lower end of the member 57 of the valve stem is threaded into the upper end of a lower valve stem member 60 which carries the valve 61 controlling the flow of liquid through the nipple 49. This valve, and in fact its valve stem, is identical in construction with that previously described and shown in Figs. 2 and 3 of the drawing and no further description of the same is, therefore, necessary. A helical spring 62 surrounds the valve stem bearing between the valve 61 and the plug 55 to normally hold the valve in closed position.

When a tank or container of the above-described character is equipped with my reserve tank the usual filling pipe 42 is no longer employed as a filling pipe, all liquid furnished to either the main tank or the reserve tank being supplied through the pipe 45 leading to the reserve tank. The operation is practically the same as that previously described in connection with the interiorly formed reserve tank, the liquid being poured into the pipe 45, while the valve 61 of the reserve tank is closed, until the reserve tank 43 is completely filled. When this has been accomplished, any further liquid poured into the pipe 45 will escape through the pipes 47 and 42 to the main tank 41, filling the same. When all the liquid has been withdrawn from the main tank 41, the valve 61 may be opened to discharge the contents of the reserve tank into the main tank through the pipes 50 and 42. It will, of course, be apparent that that part of the usual filling pipe 42 above the T-coupling 48 may be dispensed with, the T-coupling being replaced by an elbow. This, however, is not usually done, as I prefer to leave this pipe open, save for a removable cap at its upper end, in order that it may act as a vent pipe for both tanks during the filling of the same and in order that a measuring rod may be passed downwardly therethrough to permit measuring of the liquid contained in the main tank 41.

From the foregoing description, it will be apparent that my reserve tank may be applied, with very slight structural change, to all forms of liquid containers now in general use and that the specific construction of the reserve tank, valve and other parts are susceptible of many changes.

The screen 12 includes a foraminous body member supported in the opening of the main tank by a spider including inner and outer rings 12' connected by radial spokes 12''. This construction forms in effect a spider, the outer ring serving as a support for the screen, while the inner ring serves as a support for a funnel during filling of the tank. The spider 36 is somewhat greater in diameter than the valve 25 so that by unthreading the spider from the nipple, the spider, valve and valve stem may be raised completely out of the tank for repairs or adjustment.

It will of course be understood that I do not wish in any way to limit myself to the specific details of construction illustrated in the drawings and described in the specification, as any changes, within the scope of the appended claims, may be made at any time, without in the slightest degree departing from the spirit of my invention.

What I claim is:—

1. The combination with a closed container provided with a filling opening in its top, a reserve container mounted within the container with its top and bottom spaced from the top and bottom thereof, the top and bottom of the reserve container being provided with openings in alinement with each other and with the filling opening of the container, a nipple extending through the opening in the top of the reserve container, a funnel surrounding the upper end of the nipple and terminating short of the top of the container, a spider having threaded engagement in the nipple, a valve stem movable through the spider, a valve carried by the valve stem and adapted to close the opening in the bottom of the reserve container, a spring surrounding the valve stem and bearing against the valve and spider to normally hold the valve in closed position, and a shoulder formed upon the valve stem to limit its upward movement against the action of the spring.

2. The combination with a container having a filling opening in its top, a reserve container mounted within the first container with an opening in its top alining with the opening in the top of the first container, a nipple extending through the opening in the top of the reserve container, a funnel surrounding the upper end of the nipple and spaced below the top of the first container, said funnel having a measuring rod receiving slot, and means for governing discharge of liquid from the reserve container into the first container.

3. The combination with a container provided with a filling opening in its top, a reserve container mounted within the first and with openings in its top and bottom in alinement with the opening of the first container, a nipple extending through the opening in the top of the reserve container, a spider seating in the nipple, a valve normally closing the opening in the bottom of the reserve container, a valve stem carried by the valve and extending through the spider, and means for limiting movement of the valve stem to open the valve.

4. The combination with a closed container provided with a filling opening in its top, of a reserve container mounted within the first container and having openings in its top and bottom in alinement with the opening of the first container, a guide carried by the reserve container, a valve stem slidable in the guide, and a valve carried by the valve stem to close the opening in the bottom of the reserve container, said valve including a valve disk and packing disk through which a reduced extension of the valve stem extends, and a conical centering and clamping member secured to the reduced extension of the valve stem to clamp the disk and packing member to each other and to the stem.

5. The combination with a main container, of a reserve container communicating near its upper portion with the main container, communicating means between the lower portion of the reserve container and the main container, a guide carried by the reserve container, a valve stem slidable in the guide, and a valve carried by the stem and normally shutting off the lower communication between the containers, said valve including a valve disk and packing disk through which a reduced extension of the valve stem projects, and a conical centering and clamping member secured to the reduced extension of the valve stem to clamp the disk and packing member to each other and to the stem.

In testimony whereof I affix my signature in presence of two witnesses.

LEWIS H. WILSON. [L. S.]

Witnesses:
E. G. WILSON,
JOS. EVENSON.